(12) United States Patent
Wang

(10) Patent No.: US 10,433,214 B2
(45) Date of Patent: Oct. 1, 2019

(54) SYNCHRONIZATION METHOD, APPARATUS, AND SYSTEM FOR CALL SUPPLEMENTARY SERVICE CONFIGURATION

(71) Applicant: Huawei Technologies Co., Ltd., Shenzhen, Guangdong (CN)

(72) Inventor: Wenlin Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/547,764

(22) PCT Filed: Jan. 30, 2015

(86) PCT No.: PCT/CN2015/071952
§ 371 (c)(1),
(2) Date: Jul. 31, 2017

(87) PCT Pub. No.: WO2016/119218
PCT Pub. Date: Aug. 4, 2016

(65) Prior Publication Data
US 2018/0020381 A1  Jan. 18, 2018

(51) Int. Cl.
*H04W 36/00* (2009.01)
*H04W 56/00* (2009.01)
(Continued)

(52) U.S. Cl.
CPC ....... *H04W 36/0022* (2013.01); *H04L 41/084* (2013.01); *H04L 41/0853* (2013.01);
(Continued)

(58) Field of Classification Search
CPC ... H04W 36/0022; H04W 48/18; H04W 4/16; H04W 36/0079; H04W 36/0083;
(Continued)

(56) References Cited

U.S. PATENT DOCUMENTS 6,353,737 B1   3/2002  Herzog
2004/0198357 A1  10/2004  Plyle et al.
(Continued)

FOREIGN PATENT DOCUMENTS

CN   1859426 A   11/2006
CN   1937585 A   3/2007
(Continued)

*Primary Examiner* — Jae Y Lee
*Assistant Examiner* — Aixa A Guadalupe Cruz
(74) *Attorney, Agent, or Firm* — Kilpatrick Townsend & Stockton, LLP

(57) ABSTRACT

A synchronization method for call supplementary service configuration includes: receiving an entered supplementary service configuration instruction, and obtaining a configuration parameter corresponding to the supplementary service configuration instruction; uploading the configuration parameter to a mobile switching center by using a circuit switched domain, so that the mobile switching center stores the configuration parameter as call supplementary service configuration of the circuit switched domain into a home location register; receiving returned configuration feedback information; and determining, according to the configuration feedback information, whether configuration succeeds, and storing the configuration parameter as on-terminal call supplementary service configuration if the configuration succeeds.

17 Claims, 12 Drawing Sheets

(51) Int. Cl.
    *H04W 4/16*     (2009.01)
    *H04W 8/02*     (2009.01)
    *H04L 12/24*     (2006.01)

(52) U.S. Cl.
    CPC ........... *H04L 41/0886* (2013.01); *H04W 4/16* (2013.01); *H04W 8/02* (2013.01); *H04W 36/0066* (2013.01); *H04W 56/00* (2013.01); *H04M 2203/053* (2013.01)

(58) Field of Classification Search
    CPC ..... H04W 56/00; H04W 60/04; H04W 76/16; H04W 8/04; H04W 8/12; H04M 7/006
    See application file for complete search history.

(56) References Cited

U.S. PATENT DOCUMENTS

| | | | |
|---|---|---|---|
| 2008/0090570 A1 | 4/2008 | Deshpande et al. | |
| 2008/0130624 A1* | 6/2008 | Hua | H04M 7/123 370/350 |
| 2009/0029697 A1 | 1/2009 | Bianconi et al. | |
| 2010/0167705 A1* | 7/2010 | Noldus | H04M 7/1235 455/414.1 |
| 2011/0081011 A1* | 4/2011 | Gavita | H04M 1/57 379/201.02 |
| 2013/0194976 A1 | 8/2013 | Choi | |
| 2016/0100306 A1* | 4/2016 | Brianza | H04W 8/04 455/433 |

FOREIGN PATENT DOCUMENTS

| | | |
|---|---|---|
| CN | 101127613 A | 2/2008 |
| CN | 101652985 A | 2/2010 |
| JP | H11-168560 A | 6/1999 |
| JP | H11355850 A | 12/1999 |
| JP | 2000-349928 A | 12/2000 |
| JP | 2002247194 A | 8/2002 |
| JP | 2010-103750 A | 5/2010 |
| KR | 100820852 B1 | 4/2008 |
| KR | 20090074213 A | 7/2009 |
| KR | 20120023469 A | 3/2012 |

\* cited by examiner

SYNCHRONIZATION METHOD, APPARATUS, AND SYSTEM FOR CALL SUPPLEMENTARY SERVICE CONFIGURATION

CROSS-REFERENCE TO RELATED APPLICATIONS

This application is a national stage of International Application No. PCT/CN2015/071952, filed on Jan. 30, 2015, which is hereby incorporated by reference in its entirety.

TECHNICAL FIELD

The present invention relates to the field of communications technologies, and in particular, to a synchronization method, apparatus, and system for call supplementary service configuration.

BACKGROUND

Supplementary services are improvements and supplements to basic services in mobile communications, and mainly include seven categories: call identification, call forwarding, call completion, multiparty call, call barring, charging notification, and closed user group. For example, a call waiting service is one of supplementary services of a voice call service (basic service). A function of the call waiting service is as follows: When a mobile phone user is on a call, and another call is initiated to the user, in this case, a party that initiates the new call is set to wait, and the user on a call may select whether to answer the new incoming call, or reject or neglect the new incoming call.

However, with a generational shift of a communications network, an implementation manner of the supplementary services in each generation of communications network is not the same. For example, in a conventional 2G (GSM, CDMA, and the like) or 3G (WCDMA and the like) network, a voice call service and its corresponding supplementary service are borne by a circuit switched domain (that is, CS domain, Circuit Switch), and service configuration of the voice call service is stored in a subscriber configuration database (that is, HLR, Home Location Register, home location register) on a network side in a core network. When the corresponding supplementary service is conducted, a mobile switching center (MSC, Mobile Switching Center) reads the corresponding service configuration. However, in an emerging LTE (Long Term Evolution, Long Term Evolution system, that is, a 4G network) network, a voice call uses a VoLTE (Voice over LTE Network) technology, and is borne by an IMS (IP Multimedia Subsystem, multimedia subsystem) domain of the LTE network. Service configuration of a VoLTE service is stored on a terminal. When a user moves from an area covered by the LTE network to an area covered by the conventional 2G or 3G network and a handover occurs, a case in which call supplementary service configuration is not synchronous occurs, thereby requiring the user to manually re-perform configuration. Therefore, a capability of adapting to multiple communications networks in a process of performing call supplementary service configuration in a conventional technology is relatively low.

SUMMARY

In view of this, it is necessary to provide a synchronization method for call supplementary service configuration that can improve a capability of adapting to multiple communications networks. The method includes:

receiving an entered supplementary service configuration instruction, and obtaining a configuration parameter corresponding to the supplementary service configuration instruction;

uploading the configuration parameter to a mobile switching center by using a circuit switched domain, so that the mobile switching center stores the configuration parameter as call supplementary service configuration of the circuit switched domain into a home location register;

receiving returned configuration feedback information; and determining, according to the configuration feedback information, whether configuration succeeds, and storing the configuration parameter as on-terminal call supplementary service configuration if the configuration succeeds.

In a first possible implementation manner of a first aspect, before the step of receiving an entered supplementary service configuration instruction, the method further includes:

receiving a power-on instruction, and downloading call supplementary service configuration of the circuit switched domain by using the circuit switched domain from the home location register; and storing the downloaded call supplementary service configuration of the circuit switched domain as on-terminal call supplementary service configuration.

With reference to the possible implementation manner of the first aspect, in a second possible implementation manner, before the step of receiving an entered supplementary service configuration instruction, the method further includes:

receiving a service configuration display instruction, and downloading call supplementary service configuration of the circuit switched domain by using the circuit switched domain from the home location register; and storing the downloaded call supplementary service configuration of the circuit switched domain as on-terminal call supplementary service configuration, and displaying the on-terminal call supplementary service configuration.

With reference to the first aspect and the first or the second possible implementation manner of the first aspect, in a third possible implementation manner, the step of downloading call supplementary service configuration of the circuit switched domain by using the circuit switched domain from the home location register is:

invoking a communications interface function of a radio interface layer, and downloading the call supplementary service configuration of the circuit switched domain from the home location register by using the function.

With reference to the possible implementation manners of the first aspect, in a fourth possible implementation manner, after the step of determining, according to the configuration feedback information, whether configuration succeeds, the method further includes:

discarding the configuration parameter if the configuration fails.

With reference to the possible implementation manners of the first aspect, in a fifth possible implementation manner, after the step of determining, according to the configuration feedback information, whether configuration succeeds, the method further includes:

storing the configuration parameter as on-terminal call supplementary service configuration if the configuration fails; and periodically uploading the on-terminal call supplementary service configuration to the mobile switching center, so that the mobile switching center stores the on-terminal call supplementary service configuration as the call supplementary service configuration of the circuit switched domain into the home location register.

With reference to the possible implementation manners of the first aspect, in a sixth possible implementation manner, after the step of determining, according to the configuration feedback information, whether configuration succeeds, the method further includes:

storing the configuration parameter as the on-terminal call supplementary service configuration if the configuration fails; and when it is detected that a network handover occurs, uploading the on-terminal call supplementary service configuration to the mobile switching center, so that the mobile switching center stores the on-terminal call supplementary service configuration as the call supplementary service configuration of the circuit switched domain into the home location register.

In addition, it is further necessary to provide a synchronization apparatus for call supplementary service configuration that can improve a capability of adapting to multiple communications networks.

A second aspect of an embodiment of the present invention provides a synchronization apparatus for call supplementary service configuration, including:

a configuration instruction receiving module, configured to receive an entered supplementary service configuration instruction, and obtain a configuration parameter corresponding to the supplementary service configuration instruction;

a circuit switched domain configuration module, configured to upload the configuration parameter to a mobile switching center by using a circuit switched domain, so that the mobile switching center stores the configuration parameter as call supplementary service configuration of the circuit switched domain into a home location register;

a feedback information receiving module, configured to receive returned configuration feedback information; and a local configuration module, configured to determine, according to the configuration feedback information, whether configuration succeeds, and store the configuration parameter as on-terminal call supplementary service configuration if the configuration succeeds.

In a first possible implementation manner of the second aspect, the apparatus further includes a power-on synchronization module, configured to receive a power-on instruction, and download call supplementary service configuration of the circuit switched domain by using the circuit switched domain from the home location register; and store the downloaded call supplementary service configuration of the circuit switched domain as on-terminal call supplementary service configuration.

With reference to the possible implementation manner of the second aspect, in a second possible implementation manner, the apparatus further includes a configuration display module, configured to receive a service configuration display instruction, and download call supplementary service configuration of the circuit switched domain by using the circuit switched domain from the home location register; and store the downloaded call supplementary service configuration of the circuit switched domain as on-terminal call supplementary service configuration, and display the on-terminal call supplementary service configuration.

With reference to the second aspect and the first or the second possible implementation manner of the second aspect, in a third possible implementation manner, the power-on synchronization module or the configuration display module is further configured to invoke a communications interface function of a radio interface layer, and download call supplementary service configuration of the circuit switched domain from the home location register by using the function.

With reference to the possible implementation manners of the second aspect, in a fourth possible implementation manner, the local configuration module is further configured to discard the configuration parameter if the configuration fails.

With reference to the possible implementation manners of the second aspect, in a fifth possible implementation manner, the local configuration module is further configured to store the configuration parameter as on-terminal call supplementary service configuration if the configuration fails; and periodically upload the on-terminal call supplementary service configuration to the mobile switching center, so that the mobile switching center stores the on-terminal call supplementary service configuration as the call supplementary service configuration of the circuit switched domain into the home location register.

With reference to the possible implementation manners of the second aspect, in a sixth possible implementation manner, the local configuration module is further configured to store the configuration parameter as the on-terminal call supplementary service configuration if the configuration fails; and when it is detected that a network handover occurs, upload the on-terminal call supplementary service configuration to the mobile switching center, so that the mobile switching center stores the on-terminal call supplementary service configuration as the call supplementary service configuration of the circuit switched domain into the home location register.

In addition, it is further necessary to provide a synchronization system for call supplementary service configuration that can improve a capability of adapting to multiple communications networks.

A third aspect of an embodiment of the present invention provides a synchronization system for call supplementary service configuration, including a terminal and a home location register, where the terminal is configured to receive an entered supplementary service configuration instruction, and obtain a configuration parameter corresponding to the supplementary service configuration instruction; and upload the configuration parameter to a mobile switching center by using a circuit switched domain, so that the mobile switching center stores the configuration parameter as call supplementary service configuration of the circuit switched domain into the home location register;

the home location register returns corresponding configuration feedback information to the terminal by using the mobile switching center; and the terminal is further configured to determine, according to the configuration feedback information, whether configuration succeeds, and store the configuration parameter as on-terminal call supplementary service configuration into the terminal if the configuration succeeds.

In a first possible implementation manner of the third aspect, the system further includes a home subscriber server, where the terminal is further configured to: when being handed over to a communications network based on the circuit switched domain, obtain the on-terminal call supplementary service configuration stored on the terminal, and upload the on-terminal call supplementary service configuration stored on the terminal to the home subscriber server corresponding to the terminal for storage; and the home subscriber server is further configured to send the on-terminal call supplementary service configuration to the home location register corresponding to the terminal, where the on-terminal call supplementary service configuration is stored as call supplementary service configuration of the circuit switched domain.

With reference to the possible implementation manner of the third aspect, in a second possible implementation manner, the home location register is further configured to: when the terminal is handed over to a communications network based on a multimedia subsystem, send call supplementary service configuration, of the circuit switched domain, corresponding to the terminal to the home subscriber server corresponding to the terminal; and the home subscriber server is further configured to deliver the received call supplementary service configuration, of the circuit switched domain, corresponding to the terminal to the terminal, so that the terminal stores the call supplementary service configuration, of the circuit switched domain, corresponding to the terminal as on-terminal call supplementary service configuration.

In addition, for the foregoing synchronization system for call supplementary service configuration, correspondingly, it is further necessary to provide a synchronization method for call supplementary service configuration that can improve a capability of adapting to multiple communications networks.

The synchronization method for call supplementary service configuration includes:

receiving, by a terminal, an entered supplementary service configuration instruction, and obtaining a configuration parameter corresponding to the supplementary service configuration instruction; and uploading the configuration parameter to a mobile switching center by using a circuit switched domain, so that the mobile switching center stores the configuration parameter as call supplementary service configuration of the circuit switched domain into a home location register;

returning, by the home location register, corresponding configuration feedback information to the terminal by using the mobile switching center; and further determining, by the terminal according to the configuration feedback information, whether configuration succeeds, and storing the configuration parameter as on-terminal call supplementary service configuration into the terminal if the configuration succeeds.

In a first possible implementation manner of the third aspect, the method further includes:

obtaining, by the terminal when being handed over to a communications network based on the circuit switched domain, the on-terminal call supplementary service configuration stored on the terminal, and uploading the on-terminal call supplementary service configuration stored on the terminal to a home subscriber server corresponding to the terminal for storage; and sending, by the home subscriber server, the on-terminal call supplementary service configuration to the home location register corresponding to the terminal for storage.

With reference to the possible implementation manner of the third aspect, in a second possible implementation manner, the method further includes:

sending, by the home location register when the terminal is handed over to a communications network based on a multimedia subsystem, call supplementary service configuration, of the circuit switched domain, corresponding to the terminal to the home subscriber server corresponding to the terminal; and further delivering, by the home subscriber server, the received call supplementary service configuration, of the circuit switched domain, corresponding to the terminal to the terminal, so that the terminal stores the call supplementary service configuration, of the circuit switched domain, corresponding to the terminal as on-terminal call supplementary service configuration.

In the foregoing synchronization method for call supplementary service configuration, when performing local call supplementary service configuration, a user first performs configuration on a home location register corresponding to a terminal of the user by using a circuit switched domain, and then selects, according to a configuration result in the circuit switched domain, whether to make the local configuration take effect, so that the local configuration of the user (call supplementary service for an IMS domain) and configuration stored on the home location register (call supplementary service configuration for a CS domain) can be kept synchronous. Therefore, the local configuration of the user can be simultaneously applied to an LTE network and conventional 2G and 3G networks, and a capability, of the call supplementary service configuration stored on the terminal, to adapt to multiple communications networks is improved.

BRIEF DESCRIPTION OF THE DRAWINGS

To describe the technical solutions in the embodiments of the present invention or the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

As described above, an LTE (Long Term Evolution, Long Term Evolution system, that is, a 4G network) network is an emerging network, and currently is still in a construction stage in China. Therefore, there is a case that the LTE network and 2G and 3G networks coexist. A user needs to separately configure a call supplementary service indifferent communications networks. In this case, a non-synchronous configuration problem occurs.

For example, in an area covered by VoLTE, the user selects to disable a call waiting service. However, configuration generated by the disable operation is merely stored locally on a terminal, and is not uploaded to a home location register of a circuit switched domain of the 2G network for storage. Therefore, after the user moves to an area covered by the 2G network borne by the circuit switched domain, it is still possible that during a voice call, the user receives an incoming call reminder from a third party call (depending on a configuration file stored in the home location register corresponding to the terminal). However, a real intention of the user should be that under any circumstance, no incoming call reminder can be received during a call as long as disabling call waiting is set on a mobile phone.

Therefore, to improve network adaptation of call supplementary service configuration, a synchronization method for call supplementary service configuration is specially proposed, where the method may depend on a computer program, and the computer program may run on a computer system that complies with the von Neumann system. The computer system may be an electronic device, such as a mobile phone, a smartphone, or a tablet computer or a palmtop computer that supports a SIM card and has a cellular function.

Figure 1:
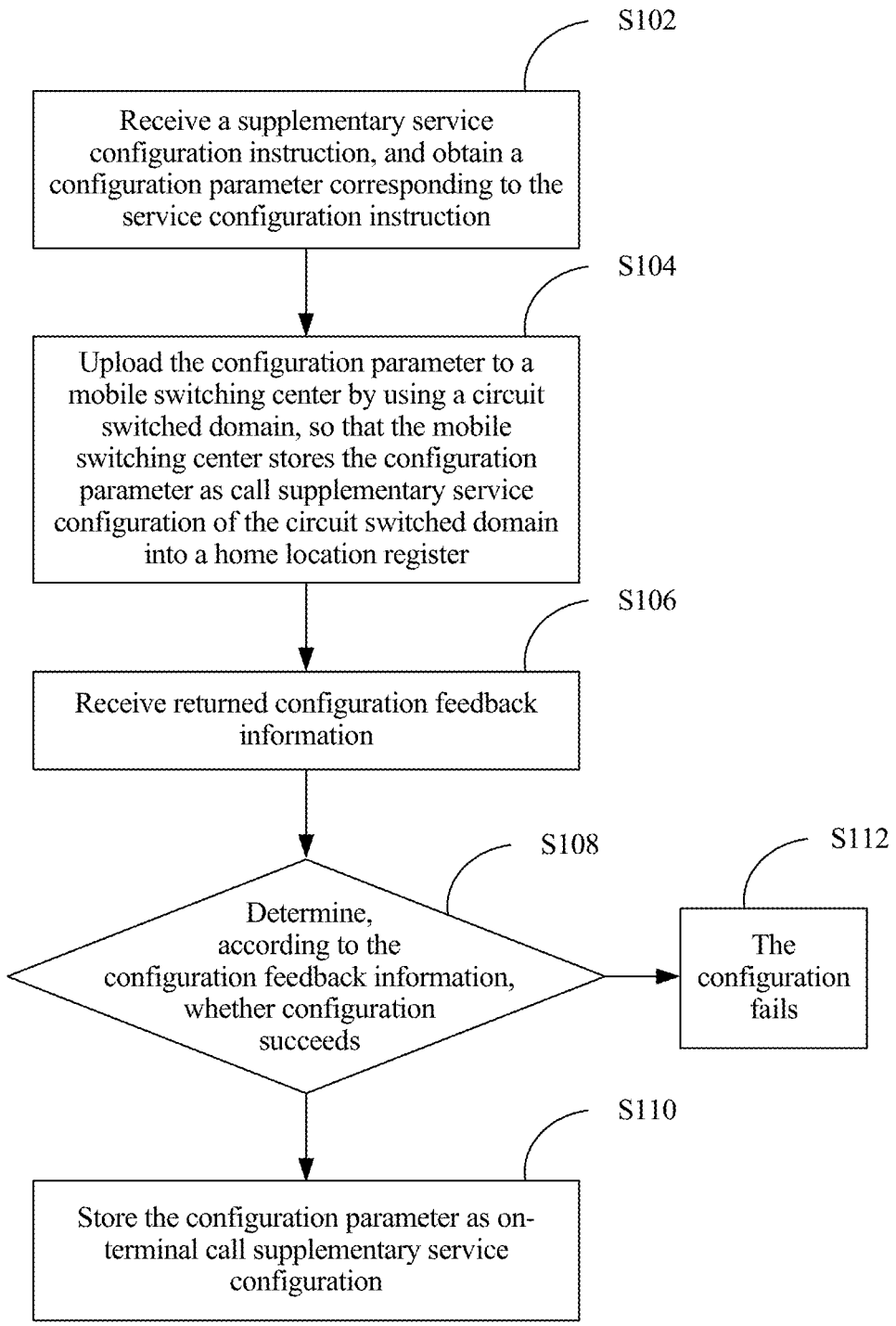
FIG. 1 is a flowchart of a synchronization method for call supplementary service configuration according to an embodiment.

In an embodiment, specifically, as shown in FIG. 1, the method includes:

Step S102: Receive an entered supplementary service configuration instruction, and obtain a configuration parameter corresponding to the supplementary service configuration instruction.

The supplementary service configuration instruction is an instruction used to configure a supplementary service, such as an instruction for enabling or disabling a call waiting service. The configuration parameter is a parameter that is used for executing a call supplementary service and that is included in the supplementary service configuration instruction.

In this embodiment, a centralized call supplementary service configuration interface may be displayed, where the centralized configuration interface is used to configure a configuration parameter of a call supplementary service that is applicable to all existing mobile network types. For example, the call waiting service may be configured by using a checkbox (checkbox). If a user selects the checkbox, which means entering a configuration instruction for enabling the call waiting service, the entered configuration parameter is enabled; or if the user deselects the checkbox, which means entering a configuration instruction for disabling the call waiting service, the entered configuration parameter is disabled. The configuration parameter that is applicable to all the mobile network types and entered by using the centralized configuration interface is on-terminal call supplementary service configuration, where the on-terminal call supplementary service configuration is stored on the terminal that performs the foregoing steps, and may be applied to a 4G network corresponding to a multimedia subsystem (IMS domain) or another communications network in which call supplementary service configuration is stored on a terminal.

Step S104: Upload the configuration parameter to a mobile switching center by using a circuit switched domain, so that the mobile switching center stores the configuration parameter as call supplementary service configuration of the circuit switched domain into a home location register.

In this embodiment, the terminal may use the foregoing entered configuration parameter as a function invoking parameter to invoke a communications interface function of a radio interface layer (RIL, radio interface layer), and send the configuration parameter to the mobile switching center MSC, located in a core network, by using the circuit switched domain. Then, the MSC sends the configuration parameter to the home location register (HLR, home location register) for storage. The configuration parameter that is related to the call supplementary service and stored in the HLR is call supplementary service configuration of the circuit switched domain.

An operating system (such as Android or Windows Mobile) of a mobile communications device such as an existing smartphone generally provides RIL framework code. When a communications interface function provided by the operating system is being invoked, a baseband processor of the mobile communications device can be controlled to perform data sending and receiving work of a radio channel, and an instruction sent by the mobile communications device is sent to the home location register by using a series of network elements through the circuit switched domain.

For example, in the Android system, a setCallWaiting function in an RIL framework (RIL communications interface function for setting the call waiting service) may be invoked to generate a corresponding instruction to control a baseband controller to send the foregoing entered configuration parameter to the home location register by using a series of network elements in the circuit switched domain for storage.

The home location register (HLR) is a database that is responsible for mobile user management in a 2G or 3G communications network; stores subscription data of a managed user and location information of the mobile user, and may provide routing information for a call to a terminal.

In this embodiment, a process in which the terminal uploads the configuration parameter by using the circuit switched domain is as follows: The terminal sends the configuration parameter to a base station controller (BSC, Base Station Controller) by using a channel of the circuit switched domain through the RIL interface. Then, the base station controller transmits the configuration parameter to the mobile switching center (MSC, Mobile Switching Center) by using a common channel signaling network (CCS, Common Channel Signalling, referred to as Signaling System 7 in China). Then, the mobile switching center sends the configuration parameter to the home location register for storage.

Step S106: Receive returned configuration feedback information.

After receiving the configuration parameter forwarded by the MSC, the home location register stores the configuration parameter into a database of the home location register. The configuration parameter is call supplementary service configuration of the circuit switched domain. Then, the home location register may return, by using the mobile switching center, configuration feedback information indicating a configuration success to the terminal. If the home location register fails to store the configuration parameter, the home location register may return configuration feedback information indicating a configuration failure to the terminal. Correspondingly, the configuration feedback information is returned to the terminal by using the above mentioned a series of network elements in the circuit switched domain. The terminal may obtain the configuration feedback information by parsing the configuration feedback information through the RIL layer.

Step S108: Determine, according to the configuration feedback information, whether configuration succeeds; if the configuration succeeds, perform step S110; otherwise, perform step S112.

Step S110: Store the configuration parameter as on-terminal call supplementary service configuration.

Step S112: Configuration fails.

If the configuration feedback information is that the configuration succeeds, the terminal stores the configuration parameter. The configuration parameter stored on the terminal is on-terminal call supplementary service configuration. That is, a service is conducted according to the on-terminal call supplementary service configuration regardless of the 2G, 3G, or 4G network. In the 2G or 3G network, the on-terminal call supplementary service configuration is the same as the call supplementary service configuration, of the circuit switched domain, stored in the home location register corresponding to the terminal. However, in the 4G network, the on-terminal call supplementary service configuration is used as call supplementary service configuration that is corresponding to the multimedia subsystem and that is stored on the terminal. If the configuration feedback information indicates a failure or receiving the configuration feedback information times out, it is determined that the configuration fails.

In an embodiment, after the configuration fails, the configuration parameter may be discarded. That is, when the home location register corresponding to the terminal fails to store the call supplementary service configuration of the circuit switched domain, the call supplementary service configuration stored on the terminal is not changed, so that the call supplementary service configuration stored on the terminal can be kept synchronous with the call supplementary service configuration, of the circuit switched domain, stored in the home location register. The terminal may further remind the user that the configuration cannot be completed due to a network problem, and advise the user to move to an environment covered by a network to re-perform configuration.

Figure 2:
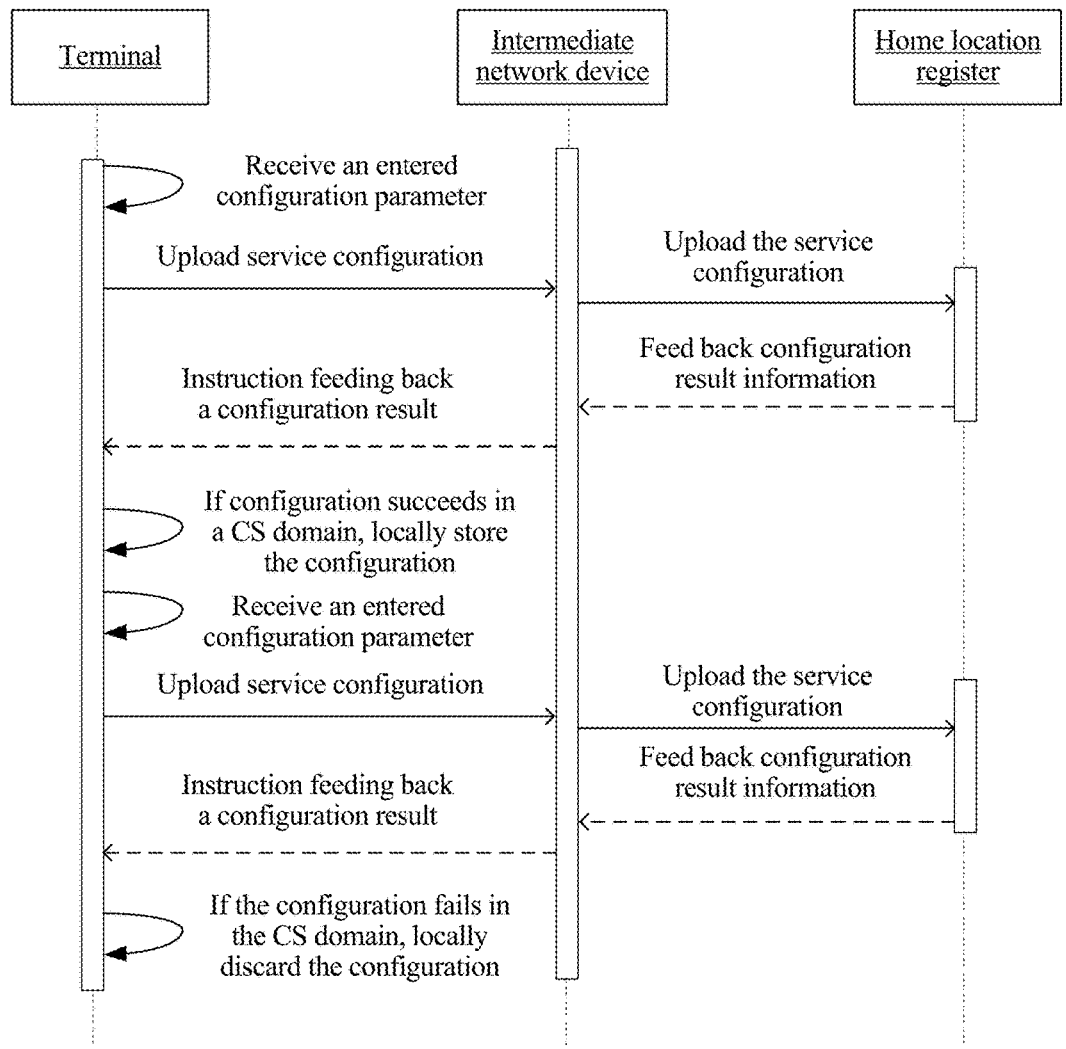
FIG. 2 is a sequence diagram of a process in which a terminal performs service configuration according to an embodiment.

For a detailed sequence process of performing the foregoing steps, refer to FIG. 2. FIG. 2 shows an overall sequence process from step S102 to step S112.

That is, when setting call supplementary service configuration on the terminal, the user first uploads, by using the circuit switched domain, the call supplementary service configuration stored on the terminal to the home location register corresponding to the terminal as call supplementary service configuration of the circuit switched domain of the terminal, so that the configuration is used to conduct the call supplementary service on the 2G or 3G network. If the call supplementary service configuration is successfully uploaded by using the circuit switched domain, the call supplementary service configuration is locally stored on the terminal, so that the call supplementary service is conducted on a 4G VoLTE network. Therefore, the call supplementary service configuration locally stored on the terminal is the same as the call supplementary service configuration, of the circuit switched domain, stored by the terminal in the home location register corresponding to the terminal. The user can complete corresponding configuration on different communications networks simultaneously by successfully performing configuration on the terminal only once. In addition, even if the user fails in configuration in the circuit switched domain, the call supplementary service configuration locally stored on the terminal is not changed, thereby ensuring consistency of the call supplementary service configuration on different communications networks. Therefore, on multiple communications networks, the foregoing call supplementary service configuration has a relatively high capability to adapt to the multiple communications networks.

Further, in this embodiment, before the step of receiving an entered supplementary service configuration instruction, the method further includes:

receiving a power-on instruction, and downloading call supplementary service configuration of the circuit switched domain by using the circuit switched domain from the home location register; and storing the downloaded call supplementary service configuration of the circuit switched domain as on-terminal call supplementary service configuration for storage.

Figure 3:
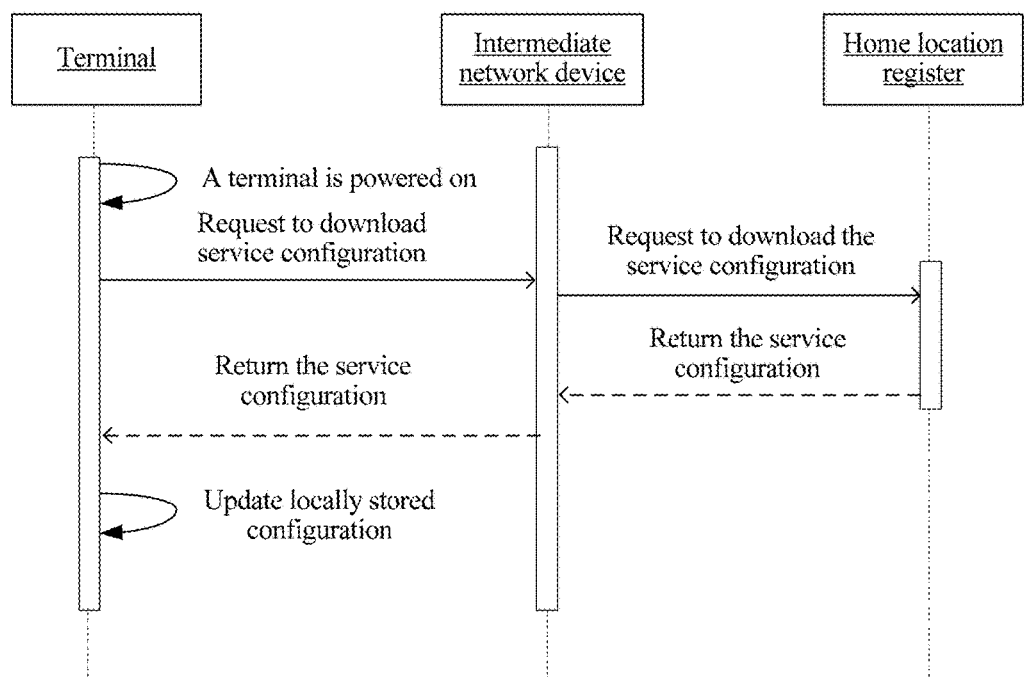
FIG. 3 is a sequence diagram in which a terminal is powered on and enables a synchronous process according to an embodiment.

For a detailed sequence process of performing the foregoing steps, refer to FIG. 3. FIG. 3 shows an overall sequence process in which the mobile phone terminal uploads, after being powered on, the call supplementary service configuration of the circuit switched domain by using the circuit switched domain to the home location register corresponding to the mobile phone terminal.

In an embodiment, the step of downloading call supplementary service configuration, of the circuit switched domain, corresponding to the terminal by using the circuit switched domain from the home location register may be specifically:

invoking a communications interface function of a radio interface layer, and downloading the call supplementary service configuration of the circuit switched domain from the home location register by using the function.

For example, in an application scenario of a smartphone that uses the Android system, as described above, when an Android phone is powered on, a communications interface function of an RIL framework provided by the Android system may be used in a startup program, for example, an RIL communications interface function of queryCallWaiting, to generate a query instruction for querying call waiting service configuration information, and the query instruction is sent to the home location register by using the circuit switched domain. The home location register queries, according to the instruction, call waiting service configuration, of the circuit switched domain, corresponding to the terminal (for example, an enabled state identifier of the service). Then, the home location register sends the call waiting service configuration to the terminal by using the mobile switching center and the BSC.

After receiving the returned call waiting service configuration of the circuit switched domain, the terminal may locally store it. The call waiting service configuration stored on the terminal may be used as call supplementary service configuration that is used on the 4G network and corresponding to the multimedia subsystem (IMS domain) or used on another communications network in which the call waiting service configuration needs to be stored on a terminal.

That is, when the terminal is powered on, the terminal may first query call supplementary service configuration, of the circuit switched domain, corresponding to the terminal by using the circuit switched domain (CS domain) from the home location register, and use the queried configuration as call supplementary service configuration of the IMS domain. Therefore, the call supplementary service configuration of the CS domain and the call supplementary service configuration of the IMS domain are consistent when the terminal is powered on, and when the terminal is powered on, the call supplementary service configuration locally stored on the terminal is kept synchronous and consistent for all network types that the terminal supports. For the user, the call supplementary service configuration stored on the terminal is configuration content that is applicable to all communications network types. There is no need to further perform separate configuration according to different categories, thereby improving a capability of adapting to multiple communications networks on multiple communications networks.

Similarly, if the terminal fails in querying call supplementary service configuration by using the circuit switched domain (a case in which the terminal is not in the area covered by the 2G network and the 3G network or signal is weak), the terminal does not modify the locally existing call supplementary service configuration.

In this embodiment, before the step of receiving an entered supplementary service configuration instruction, the method further includes:

receiving a service configuration display instruction, and downloading call supplementary service configuration of the circuit switched domain by using the circuit switched domain from the home location register; and storing the downloaded call supplementary service configuration of the circuit switched domain as on-terminal call supplementary service configuration for storage, and displaying the call supplementary service configuration.

Figure 4:
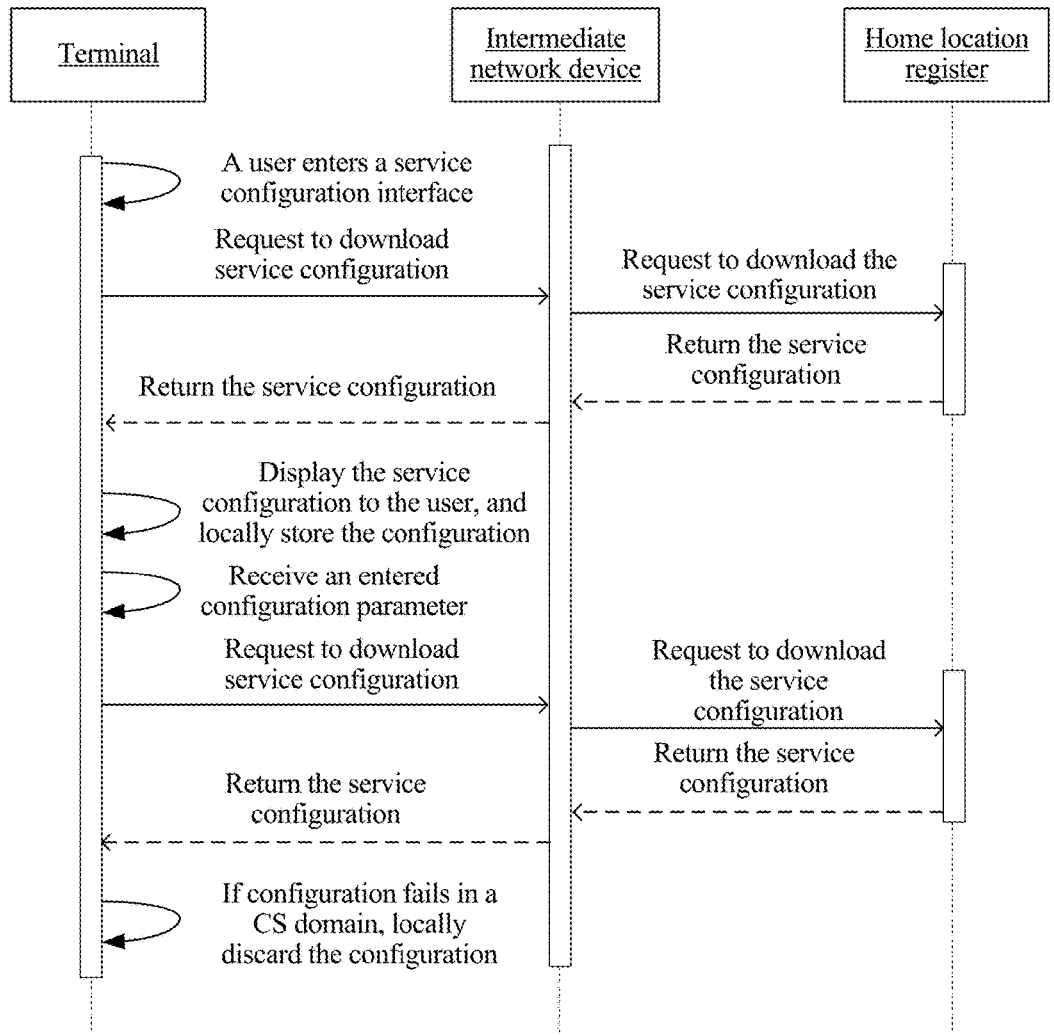
FIG. 4 is a sequence diagram of a process in which a user opens a configuration interface of a terminal according to an embodiment.

For a detailed sequence process of performing the foregoing steps, refer to FIG. 4. FIG. 4 shows an overall sequence process in which the mobile phone terminal performs call supplementary service configuration with the home location register by using the circuit switched domain after the user enters a configuration interface of the call supplementary service configuration.

For example, in an application scenario of a smartphone that uses the Android system, as described above, when the user opens a call supplementary service configuration page on the Android phone, a service configuration display instruction is entered. The terminal can invoke a communications interface function of an RIL framework provided by the Android system, for example, an RIL communications interface function of queryCallWaiting, to generate a query instruction for querying call waiting service configuration information and send the query instruction to the home location register. The home location register queries, according to the instruction, call waiting service configuration, of the circuit switched domain, corresponding to the terminal (for example, an enabled state identifier of the service), and then returns the call waiting service configuration to the terminal by using the mobile switching center.

After receiving the returned call waiting service configuration of the circuit switched domain, the terminal displays, on the page, the returned call waiting service configuration of the circuit switched domain to the user, and then locally stores the returned call waiting service configuration of the circuit switched domain to override locally stored call waiting service configuration. The returned call waiting service configuration of the circuit switched domain may be used as call supplementary service configuration corresponding to the multimedia subsystem (IMS domain).

In another embodiment, if a performing result of step S108 of determining, according to the configuration feedback information, whether configuration succeeds is that the configuration fails, the configuration parameter may still be stored as on-terminal call supplementary service configuration. However, there is a need to periodically upload the call supplementary service configuration stored on the terminal to the mobile switching center, so that the mobile switching center stores the call supplementary service configuration stored on the terminal as call supplementary service configuration of the circuit switched domain into the home location register.

Figure 5:
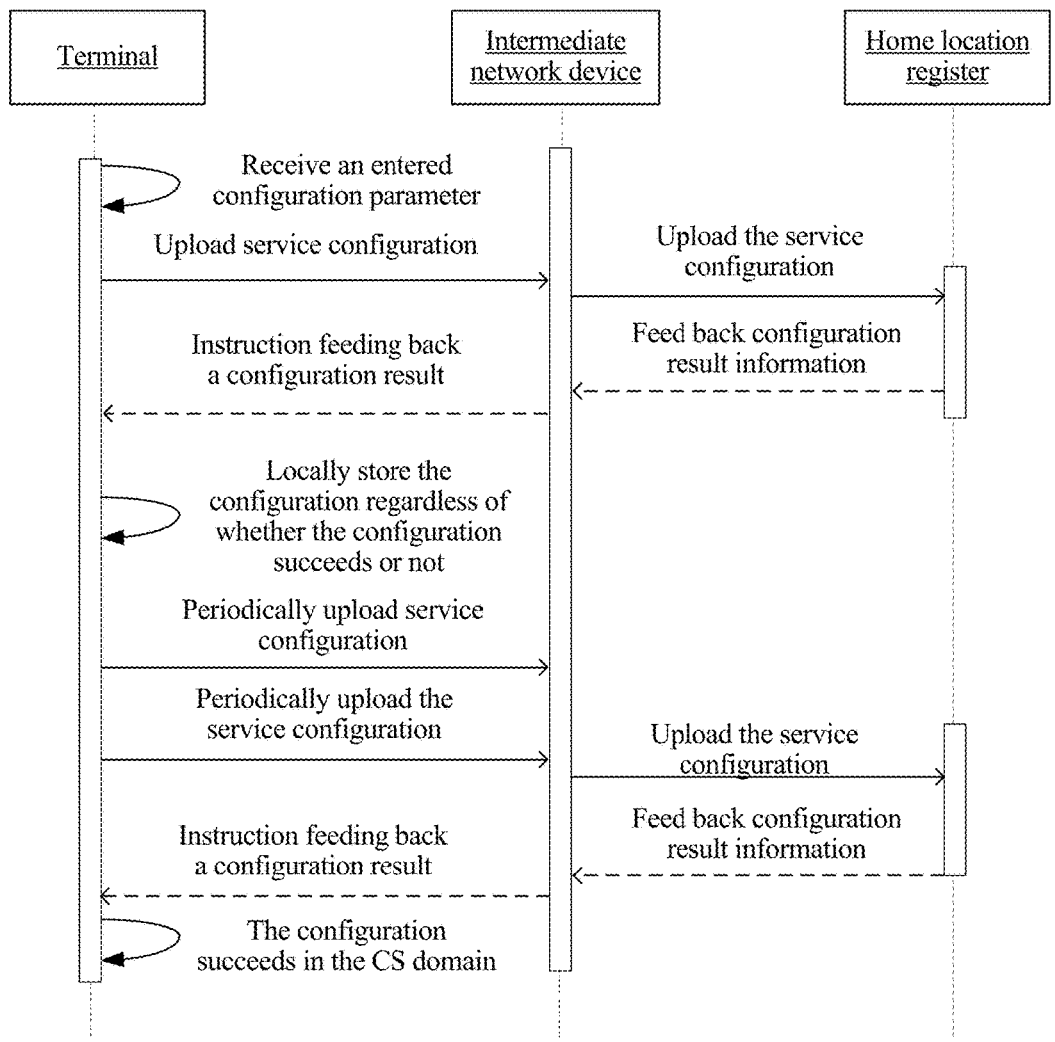
FIG. 5 is a sequence diagram of a process in which a terminal is periodically and automatically synchronized according to an embodiment.

For a detailed sequence process of performing the foregoing steps, refer to FIG. 5. FIG. 5 shows an overall sequence process in which the mobile phone terminal periodically re-performs configuration after failing to upload the call supplementary service configuration of the circuit switched domain to the home location register by using the circuit switched domain.

That is, in this embodiment, when the user opens the call supplementary service configuration interface of the terminal to perform configuration, if a returned result obtained after the call supplementary service configuration of the circuit switched domain is uploaded to the home location register by using the circuit switched domain is a setting failure or a timeout (the terminal is not in the area covered by the 2G or 3G network or a signal of the terminal is weak), the call supplementary service configuration entered by the user is still used as on-terminal call supplementary service configuration for storage. However, the call supplementary service configuration is continually sent to the home location register periodically, until the home location register returns configuration feedback information indicating a configuration success.

As described in the foregoing example, if the user locally sets the call waiting service to an enabled state, but a setting result returned by using the communications interface function setCallWaiting of the RIL framework indicates a failure, the call waiting service is still set to the enabled state on the terminal. However, there is still a need to invoke the communications interface function setCallWaiting of the RIL framework at an interval of a preset time (for example, 10 minutes, half an hour, or 1 hour) to initiate a configuration parameter for setting the call waiting service to the enabled state to the home location register. If the terminal moves to the area covered by the 2G or 3G network or signal strength of the terminal recovers, a configuration success message returned by the home location register may be received. Therefore, logic of invoking the setCallWaiting function periodically is ended.

Using this solution may enable the user to perform configuration in any environment. For example, if the user is in confined space and the foregoing solution is used, a configuration failure is always prompted in a process of performing call supplementary service configuration by the user in the confined space because the configuration cannot be completed by using the circuit switched domain. The user needs to move to an area in which signal strength is relatively strong so as to complete the configuration process. However, after the process is added, the user in the confined space needs to perform configuration only once. After the user leaves the confined space and signal strength recovers, the terminal may automatically complete corresponding configuration by using the circuit switched domain, thereby reducing a quantity of times that the user performs configuration, and improving operation convenience.

In another embodiment, if a performing result of step S108 of determining, according to the configuration feedback information, whether configuration succeeds is that the configuration fails, the configuration parameter may still be stored as on-terminal call supplementary service configuration. However, a network handover event needs to be detected. When it is detected that a network handover occurs, overall call supplementary service configuration stored on the terminal is uploaded to the mobile switching center, so that the mobile switching center stores the overall call supplementary service configuration stored on the terminal as call supplementary service configuration of the circuit switched domain into the home location register. That is, when the configuration fails, there is no need to periodically upload the call supplementary service configuration of the circuit switched domain, but the call supplementary service configuration of the circuit switched domain needs to be uploaded only when a handover of the communications network occurs.

The network handover event is a system event triggered when a coverage area in which the terminal is located is handed over from the LTE network to the 2G or 3G network, or a coverage area is handed over from the 2G or 3G network to the LTE network. When it is detected that a network handover occurs, the terminal is definitely in coverage of a 2G network or a 3G network (otherwise, there is no handover process). Therefore, the circuit switched domain keeps in a connected state. In this case, the locally stored call supplementary service configuration is sent to the home location register for storage, thereby avoiding a case in which a circuit switched domain configuration instruction may be meaninglessly sent for multiple times in a configuration process of periodically sending the circuit switched domain configuration instruction. Therefore, a quantity of times that the circuit switched domain initiates communication is reduced. For a mobile device, power consumption is reduced, and a battery life is prolonged.

Figure 6:
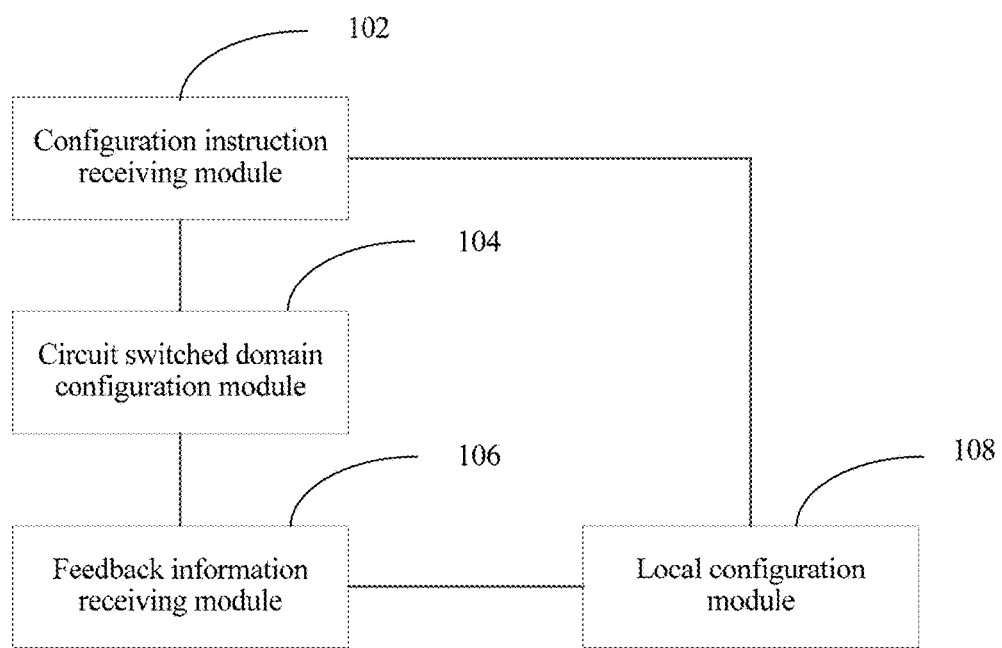
FIG. 6 is a schematic structural diagram of a synchronization apparatus for call supplementary service configuration according to an embodiment.

In an embodiment, a synchronization apparatus for call supplementary service configuration is further correspondingly provided. As shown in FIG. 6, the apparatus includes: a configuration instruction receiving module 102, a circuit switched domain configuration module 104, a feedback information receiving module 106, and a local configuration module 108.

The configuration instruction receiving module 102 is configured to receive an entered supplementary service configuration instruction, and obtain a configuration parameter corresponding to the supplementary service configuration instruction.

The circuit switched domain configuration module 104 is configured to upload the configuration parameter to a mobile switching center by using a circuit switched domain, so that the mobile switching center stores the configuration parameter as call supplementary service configuration of the circuit switched domain into a home location register.

The feedback information receiving module 106 is configured to receive returned configuration feedback information.

The local configuration module 108 is configured to determine, according to the configuration feedback information, whether configuration succeeds, and store the configuration parameter as on-terminal call supplementary service configuration if the configuration succeeds.

Figure 7:
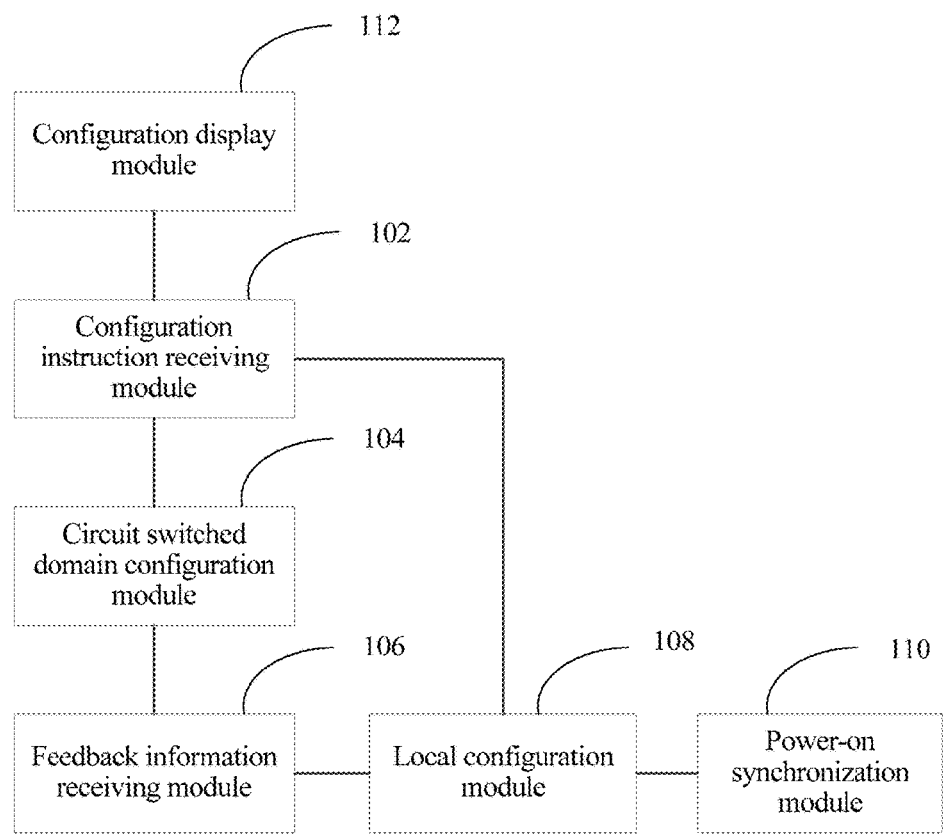
FIG. 7 is a schematic structural diagram of a synchronization apparatus for call supplementary service configuration according to another embodiment.

In an embodiment, as shown in FIG. 7, the synchronization apparatus for call supplementary service configuration further includes a power-on synchronization module 110, configured to receive a power-on instruction, and download call supplementary service configuration of the circuit switched domain by using the circuit switched domain from the home location register; and store the downloaded call supplementary service configuration of the circuit switched domain as on-terminal call supplementary service configuration.

In an embodiment, as shown in FIG. 7, the synchronization apparatus for call supplementary service configuration further includes a configuration display module 112, configured to receive a service configuration display instruction, and download call supplementary service configuration of the circuit switched domain by using the circuit switched domain from the home location register; and store the downloaded call supplementary service configuration of the circuit switched domain as on-terminal call supplementary service configuration, and display the on-terminal call supplementary service configuration.

In an embodiment, the power-on synchronization module 110 or the configuration display module 112 is further configured to invoke a communications interface function of a radio interface layer, and download call supplementary service configuration of the circuit switched domain from the home location register by using the function.

In this embodiment, the local configuration module 108 is further configured to discard the configuration parameter if the configuration fails.

In another embodiment, the local configuration module 108 is further configured to store the configuration parameter as on-terminal call supplementary service configuration if the configuration fails; and periodically upload the call supplementary service configuration stored on the terminal to the mobile switching center, so that the mobile switching center stores the call supplementary service configuration stored on the terminal as call supplementary service configuration of the circuit switched domain into the home location register.

In an embodiment, the local configuration module 108 is further configured to store the configuration parameter as on-terminal call supplementary service configuration if the configuration fails; and when it is detected that a network handover occurs, upload the call supplementary service configuration stored on the terminal to the mobile switching center, so that the mobile switching center stores the call supplementary service configuration stored on the terminal as call supplementary service configuration of the circuit switched domain into the home location register.

Figure 8:
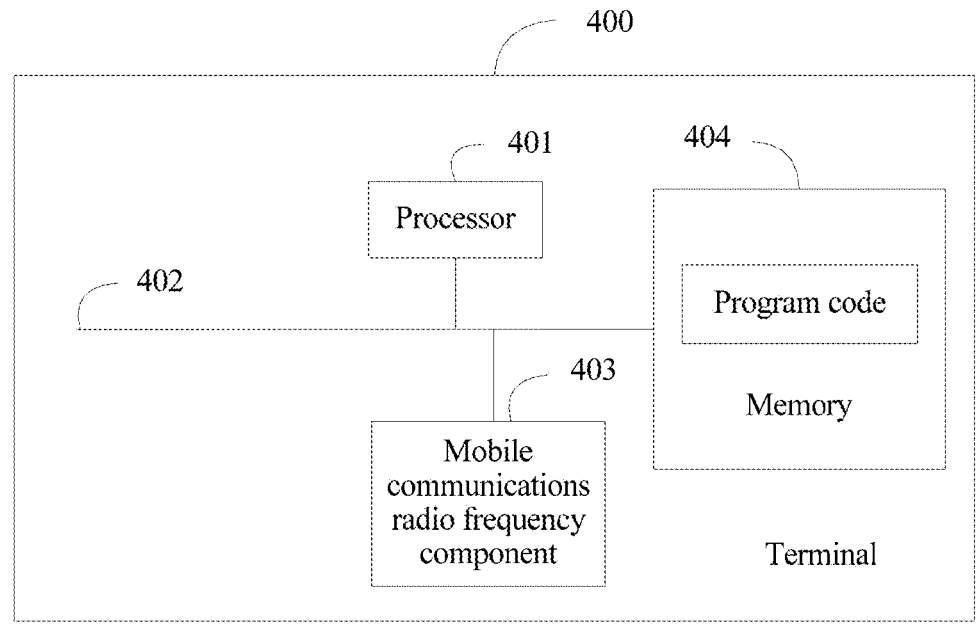
FIG. 8 is a schematic structural diagram of a terminal according to another embodiment.

FIG. 8 is a schematic structural diagram of a terminal according to an embodiment of the present invention. As shown in FIG. 8, the user equipment may include: at least one processor 401 such as a CPU or a baseband controller, at least one mobile communications radio frequency component 403, a memory 404, and at least one communications bus 402. The communications bus 402 is configured to implement connection and communication between these components. The memory 404 may be a high-speed RAM memory, or may be a non-volatile memory (non-volatile memory), such as at least one magnetic disk memory. Optionally, the memory 404 may be at least one storage apparatus located far away from the processor 401. A set of program code is stored in the memory 404, and the processor 401 is configured to invoke program code stored in the memory to perform the following operations:

receiving an entered supplementary service configuration instruction, and obtaining a configuration parameter corresponding to the supplementary service configuration instruction;

uploading the configuration parameter to a mobile switching center by using a circuit switched domain, so that the mobile switching center stores the configuration parameter as call supplementary service configuration of the circuit switched domain into a home location register;

receiving returned configuration feedback information; and determining, according to the configuration feedback information, whether configuration succeeds, and storing the configuration parameter as on-terminal call supplementary service configuration if the configuration succeeds.

Optionally, before the step of receiving an entered supplementary service configuration instruction, the processor 401 further:

receives a power-on instruction, and downloads call supplementary service configuration of the circuit switched domain by using the circuit switched domain from the home location register; and stores the downloaded call supplementary service configuration of the circuit switched domain as on-terminal call supplementary service configuration.

Optionally, before the step of receiving an entered supplementary service configuration instruction, the processor 401 further:

receives a service configuration display instruction, and downloads call supplementary service configuration of the circuit switched domain by using the circuit switched domain from the home location register; and stores the downloaded call supplementary service configuration of the circuit switched domain as on-terminal call supplementary service configuration, and displays the on-terminal call supplementary service configuration.

Optionally, the step of downloading, by the processor 401, call supplementary service configuration of the circuit switched domain by using the circuit switched domain from the home location register is:

invoking a communications interface function of a radio interface layer, and downloading the call supplementary service configuration of the circuit switched domain from the home location register by using the function.

Optionally, after the step of determining, according to the configuration feedback information, whether configuration succeeds, the processor 401 further:

discards the configuration parameter if the configuration fails.

Optionally, after the step of determining, according to the configuration feedback information, whether configuration succeeds, the processor 401 further:

stores the configuration parameter as on-terminal call supplementary service configuration if the configuration fails; and periodically uploads the call supplementary service configuration stored on the terminal to the mobile switching center, so that the mobile switching center stores the call supplementary service configuration stored on the terminal as call supplementary service configuration of the circuit switched domain into the home location register.

Optionally, after the step of determining, according to the configuration feedback information, whether configuration succeeds, the processor 401 further:

stores the configuration parameter as on-terminal call supplementary service configuration if the configuration fails; and when it is detected that a network handover occurs, uploads the call supplementary service configuration stored on the terminal to the mobile switching center, so that the mobile switching center stores the call supplementary service configuration stored on the terminal as call supplementary service configuration of the circuit switched domain into the home location register.

Figure 9:
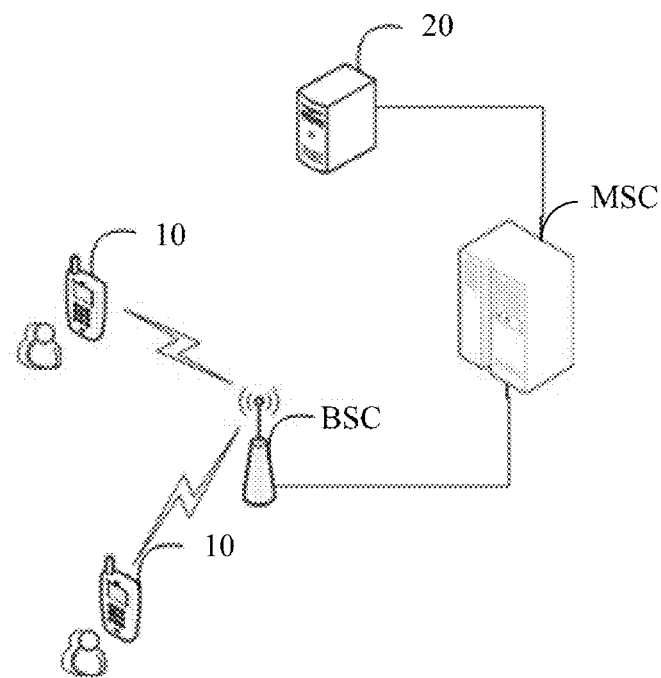
FIG. 9 is a topology diagram of a synchronization system for call supplementary service configuration according to an embodiment.

In an embodiment, to resolve the foregoing problems, a synchronization system for call supplementary service configuration is further proposed. As shown in FIG. 9, the system includes a terminal 10 and a home location register 20.

The terminal 10 is configured to receive an entered supplementary service configuration instruction, and obtain a configuration parameter corresponding to the supplementary service configuration instruction; and upload the configuration parameter to a mobile switching center by using a circuit switched domain, so that the mobile switching center stores the configuration parameter as call supplementary service configuration of the circuit switched domain into the home location register.

The home location register 20 is configured to return corresponding configuration feedback information to the terminal by using the mobile switching center.

The terminal 10 is further configured to determine, according to the configuration feedback information, whether configuration succeeds, and store the configuration parameter as on-terminal call supplementary service configuration into the terminal if the configuration succeeds.

Figure 10:
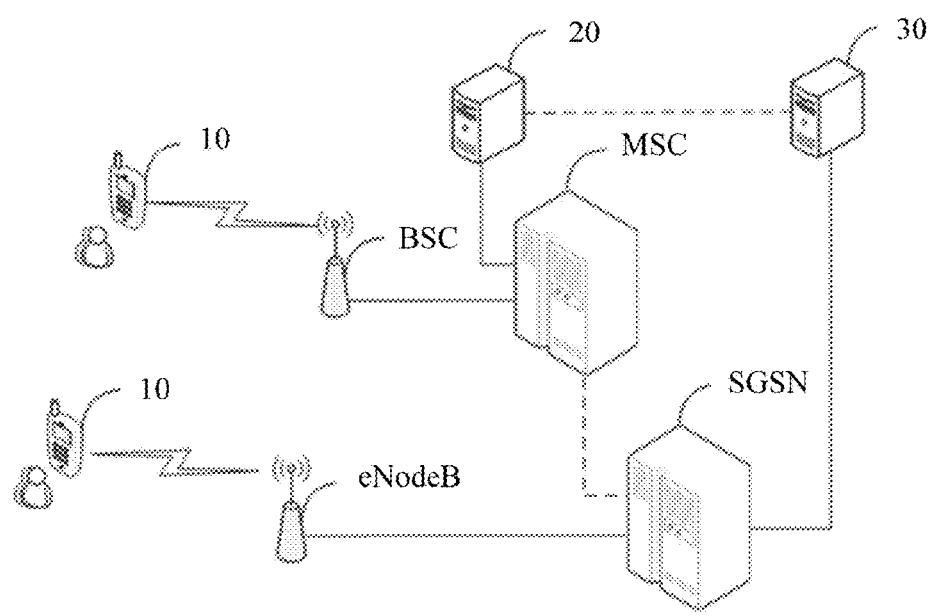
FIG. 10 is a topology diagram of a synchronization system for call supplementary service configuration according to an embodiment.

In an embodiment, as shown in FIG. 10, the synchronization system for call supplementary service configuration further includes a home subscriber server 30.

The terminal 10 is further configured to: when being handed over to a communications network based on the circuit switched domain, obtain the call supplementary service configuration stored on the terminal 10, and upload the call supplementary service configuration stored on the terminal 10 to the home subscriber server 30 corresponding to the terminal 10 for storage.

The home subscriber server 30 is further configured to send the call supplementary service configuration to the home location register 20 corresponding to the terminal 10, where the call supplementary service configuration is stored as call supplementary service configuration of the circuit switched domain.

In an embodiment, as shown in FIG. 10, the home location register 20 is further configured to: when the terminal 10 is handed over to a communications network based on a multimedia subsystem, send the call supplementary service configuration, of the circuit switched domain, corresponding to the terminal 10 to the home subscriber server 30 corresponding to the terminal.

The home subscriber server 30 is further configured to deliver the received call supplementary service configuration, of the circuit switched domain, corresponding to the terminal to the terminal 10, so that the terminal 10 stores the call supplementary service configuration, of the circuit switched domain, corresponding to the terminal as on-terminal call supplementary service configuration.

In an embodiment, to improve network adaptation of call supplementary service configuration, a synchronization method for call supplementary service configuration is further proposed for the foregoing synchronization system for call supplementary service configuration, where the method may depend on a computer program, and the computer program may run on a computer system that complies with the von Neumann system. The computer system may be the computer system shown in FIG. 9 that includes the terminal and the home location register, or the computer system shown in FIG. 10 that includes the terminal, the home location register, and the home subscriber server.

Figure 11:
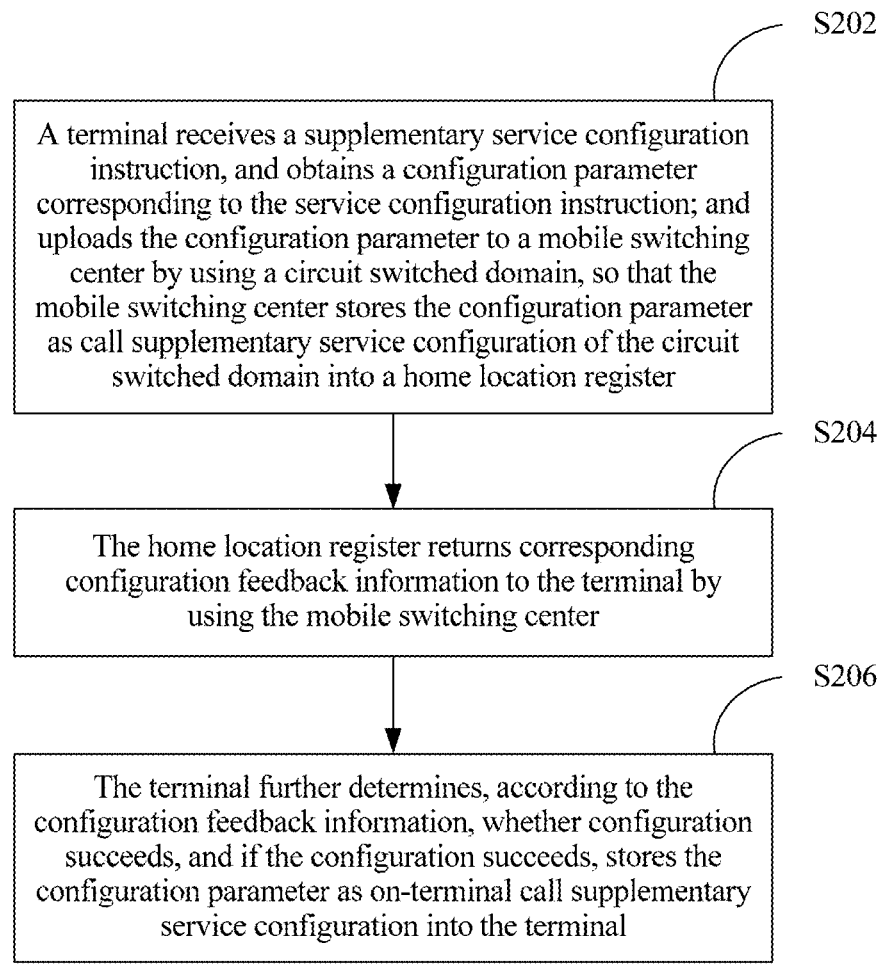
FIG. 11 is a flowchart of a synchronization method for call supplementary service configuration according to an embodiment.

In this embodiment, specifically, as shown in FIG. 11, the method includes:

Step S202: A terminal receives an entered supplementary service configuration instruction, and obtains a configuration parameter corresponding to the supplementary service configuration instruction; and uploads the configuration parameter to a mobile switching center by using a circuit switched domain, so that the mobile switching center stores the configuration parameter as call supplementary service configuration of the circuit switched domain into a home location register.

Step S204: The home location register returns corresponding configuration feedback information to the terminal by using the mobile switching center.

The supplementary service configuration instruction is an instruction used to configure a supplementary service, such as an instruction for enabling or disabling a call waiting service. The configuration parameter is a parameter that is used for executing a call supplementary service and that is included in the supplementary service configuration instruction.

In this embodiment, a centralized call supplementary service configuration interface may be displayed, where the centralized configuration interface is used to configure a configuration parameter of a call supplementary service that is applicable to all existing mobile network types. For example, the call waiting service may be configured by using a checkbox (checkbox). If a user selects the checkbox, which means entering a configuration instruction for enabling the call waiting service, the entered configuration parameter is enabled; or if the user deselects the checkbox, which means entering a configuration instruction for disabling the call waiting service, the entered configuration parameter is disabled. The configuration parameter that is applicable to all the mobile network types and entered by using the centralized configuration interface is on-terminal call supplementary service configuration, where the on-terminal call supplementary service configuration is stored on the terminal that performs the foregoing steps, and may be applied to a 4G network corresponding to a multimedia subsystem (IMS domain) or another communications network in which call supplementary service configuration is stored on a terminal.

In this embodiment, the terminal may use the foregoing entered configuration parameter as a function invoking parameter to invoke a communications interface function of a radio interface layer (RIL, radio interface layer), and send the configuration parameter to the mobile switching center MSC, located in a core network, by using the circuit switched domain. Then, the MSC sends the configuration parameter to the home location register (HLR, home location register) for storage. The configuration parameter that is related to the call supplementary service and stored in the HLR is call supplementary service configuration of the circuit switched domain.

An operating system (such as Android or Windows Mobile) of a mobile communications device such as an existing smartphone generally provides RIL framework code. When a communications interface function provided by the operating system is being invoked, a baseband processor of the mobile communications device can be controlled to perform data sending and receiving work of a radio channel, and an instruction sent by the mobile communications device is sent to the home location register by using a series of network elements through the circuit switched domain.

For example, in the Android system, a setCallWaiting function in an RIL framework (RIL communications interface function for setting the call waiting service) may be invoked to generate a corresponding instruction to control a baseband controller to send the foregoing entered configuration parameter to the home location register by using a series of network elements in the circuit switched domain for storage.

The home location register (HLR) is a database that is responsible for mobile user management in a 2G or 3G communications network; stores subscription data of a managed user and location information of the mobile user, and may provide routing information for a call to a terminal.

In this embodiment, a process in which the terminal uploads the configuration parameter by using the circuit switched domain is as follows: The terminal sends the configuration parameter to a base station controller (BSC, Base Station Controller) by using a channel of the circuit switched domain through the RIL interface. Then, the base station controller transmits the configuration parameter to the mobile switching center (MSC, Mobile Switching Center) by using a common channel signaling network (CCS, Common Channel Signalling, referred to as Signaling System 7 in China). Then, the mobile switching center sends the configuration parameter to the home location register for storage.

After receiving the configuration parameter forwarded by the MSC, the home location register stores the configuration parameter into a database of the home location register. The configuration parameter is call supplementary service configuration of the circuit switched domain. Then, the home location register may return, by using the mobile switching center, configuration feedback information indicating a configuration success to the terminal. If the home location register fails to store the configuration parameter, the home location register may return configuration feedback information indicating a configuration failure to the terminal. Correspondingly, the configuration feedback information is returned to the terminal by using the above mentioned a series of network elements in the circuit switched domain. The terminal may obtain the configuration feedback information by parsing the configuration feedback information through the RIL layer.

Step S206: The terminal further determines, according to the configuration feedback information, whether configuration succeeds, and stores the configuration parameter as on-terminal call supplementary service configuration into the terminal if the configuration succeeds.

If the configuration feedback information is that the configuration succeeds, the terminal stores the configuration parameter. The configuration parameter stored on the terminal is on-terminal call supplementary service configuration. That is, a service is conducted according to the on-terminal call supplementary service configuration regardless of the 2G, 3G, or 4G network. In the 2G or 3G network, the on-terminal call supplementary service configuration is the same as the call supplementary service configuration, of the circuit switched domain, stored in the home location register corresponding to the terminal. However, in the 4G network, the on-terminal call supplementary service configuration is used as call supplementary service configuration that is corresponding to the multimedia subsystem and that is stored on the terminal. If the configuration feedback information indicates a failure or receiving the configuration feedback information times out, it is determined that the configuration fails.

In an embodiment, after the configuration fails, the configuration parameter may be discarded. That is, when the home location register corresponding to the terminal fails to store the call supplementary service configuration of the circuit switched domain, the call supplementary service configuration stored on the terminal is not changed, so that the call supplementary service configuration stored on the terminal can be kept synchronous with the call supplementary service configuration, of the circuit switched domain, stored in the home location register. The terminal may further remind the user that the configuration cannot be completed due to a network problem, and advise the user to move to an environment covered by a network to re-perform configuration.

For a detailed sequence process of performing the foregoing steps, refer to FIG. 2. FIG. 2 shows an overall sequence process from step S202 to step S206.

That is, when setting call supplementary service configuration on the terminal, the user first uploads, by using the circuit switched domain, the call supplementary service configuration stored on the terminal to the home location register corresponding to the terminal as call supplementary service configuration of the circuit switched domain of the terminal, so that the configuration is used to conduct the call supplementary service on the 2G or 3G network. If the call supplementary service configuration is successfully uploaded by using the circuit switched domain, the call supplementary service configuration is locally stored on the terminal, so that the call supplementary service is conducted on a 4G VoLTE network. Therefore, the call supplementary service configuration locally stored on the terminal is the same as the call supplementary service configuration, of the circuit switched domain, stored by the terminal in the home location register corresponding to the terminal. The user can complete corresponding configuration on different communications networks simultaneously by successfully performing configuration on the terminal only once. In addition, even if the user fails in configuration in the circuit switched domain, the call supplementary service configuration locally stored on the terminal is not changed, thereby ensuring consistency of the call supplementary service configuration on different communications networks. Therefore, on multiple communications networks, the foregoing call supplementary service configuration has a relatively high capability to adapt to the multiple communications networks.

Further, in this embodiment, before the step of receiving an entered supplementary service configuration instruction, the method further includes:

receiving a power-on instruction, and downloading call supplementary service configuration of the circuit switched domain by using the circuit switched domain from the home location register; and storing the downloaded call supplementary service configuration of the circuit switched domain as on-terminal call supplementary service configuration for storage.

For a detailed sequence process of performing the foregoing steps, refer to FIG. 3. FIG. 3 shows an overall sequence process in which the mobile phone terminal uploads, after being powered on, the call supplementary service configuration of the circuit switched domain by using the circuit switched domain to the home location register corresponding to the mobile phone terminal.

In an embodiment, the step of downloading call supplementary service configuration, of the circuit switched domain, corresponding to the terminal by using the circuit switched domain from the home location register may be specifically:

invoking a communications interface function of a radio interface layer, and downloading the call supplementary service configuration of the circuit switched domain from the home location register by using the function.

For example, in an application scenario of a smartphone that uses the Android system, as described above, when an Android phone is powered on, a communications interface function of an RIL framework provided by the Android system may be used in a startup program, for example, an RIL communications interface function of queryCallWaiting, to generate a query instruction for querying call waiting service configuration information, and the query instruction is sent to the home location register by using the circuit switched domain. The home location register queries, according to the instruction, call waiting service configuration, of the circuit switched domain, corresponding to the terminal (for example, an enabled state identifier of the service). Then, the home location register sends the call waiting service configuration to the terminal by using the mobile switching center and the BSC.

After receiving the returned call waiting service configuration of the circuit switched domain, the terminal may locally store it. The call waiting service configuration stored on the terminal may be used as call supplementary service configuration that is used on the 4G network and corresponding to the multimedia subsystem (IMS domain) or used on another communications network in which the call waiting service configuration needs to be stored on a terminal.

That is, when the terminal is powered on, the terminal may first query call supplementary service configuration, of the circuit switched domain, corresponding to the terminal by using the circuit switched domain (CS domain) from the home location register, and use the queried configuration as call supplementary service configuration of the IMS domain. Therefore, the call supplementary service configuration of the CS domain and the call supplementary service configuration of the IMS domain are consistent when the terminal is powered on, and when the terminal is powered on, the call supplementary service configuration locally stored on the terminal is kept synchronous and consistent for all network types that the terminal supports. For the user, the call supplementary service configuration stored on the terminal is configuration content that is applicable to all communications network types. There is no need to further perform separate configuration according to different categories, thereby improving a capability of adapting to multiple communications networks on multiple communications networks.

Similarly, if the terminal fails in querying call supplementary service configuration by using the circuit switched domain (a case in which the terminal is not in the area covered by the 2G network and the 3G network or signal is weak), the terminal does not modify the locally existing call supplementary service configuration.

In this embodiment, the method further includes:

receiving, by the terminal, a service configuration display instruction, and downloading call supplementary service configuration of the circuit switched domain by using the circuit switched domain from the home location register; and storing the downloaded call supplementary service configuration of the circuit switched domain as on-terminal call supplementary service configuration for storage, and displaying the call supplementary service configuration.

For a detailed sequence process of performing the foregoing steps, refer to FIG. 4. FIG. 4 shows an overall sequence process in which the mobile phone terminal performs call supplementary service configuration with the home location register by using the circuit switched domain after the user enters a configuration interface of the call supplementary service configuration.

For example, in an application scenario of a smartphone that uses the Android system, as described above, when the user opens a call supplementary service configuration page on the Android phone, a service configuration display instruction is entered. The terminal can invoke a communications interface function of an RIL framework provided by the Android system, for example, an RIL communications interface function of queryCallWaiting, to generate a query instruction for querying call waiting service configuration information of the circuit switched domain and send the query instruction to the home location register. The home location register queries, according to the instruction, call waiting service configuration, of the circuit switched domain, corresponding to the terminal (for example, an enabled state identifier of the service), and then returns the call waiting service configuration to the terminal by using the mobile switching center.

After receiving the returned call waiting service configuration of the circuit switched domain, the terminal displays, on the page, the returned call waiting service configuration of the circuit switched domain to the user, and then locally stores the returned call waiting service configuration of the circuit switched domain to override locally stored call waiting service configuration. The returned call waiting service configuration of the circuit switched domain may be used as call supplementary service configuration corresponding to the multimedia subsystem (IMS domain).

In an embodiment, if a performing result of step S206 of determining, by the terminal according to the configuration feedback information, whether configuration succeeds is that the configuration fails, the configuration parameter may still be stored as on-terminal call supplementary service configuration. However, there is a need to periodically upload the call supplementary service configuration stored on the terminal to the mobile switching center, so that the mobile switching center stores the call supplementary service configuration stored on the terminal as call supplementary service configuration of the circuit switched domain into the home location register.

For a detailed sequence process of performing the foregoing steps, refer to FIG. 5. FIG. 5 shows an overall sequence process in which the mobile phone terminal periodically re-performs configuration after failing to set the call supplementary service configuration in the home location register by using the circuit switched domain.

That is, in this embodiment, when the user opens the call supplementary service configuration interface of the terminal to perform configuration, if a returned result obtained after the call supplementary service configuration of the circuit switched domain is uploaded to the home location register by using the circuit switched domain is a setting failure or a timeout (the terminal is not in the area covered by the 2G or 3G network or a signal of the terminal is weak), the call supplementary service configuration entered by the user is still used as on-terminal call supplementary service configuration for storage. However, the call supplementary service configuration is continually sent to the home location register periodically, until the home location register returns configuration feedback information indicating a configuration success.

As described in the foregoing example, if the user locally sets the call waiting service to an enabled state, but a setting result returned by using the communications interface function setCallWaiting of the RIL framework indicates a failure, the call waiting service is still set to the enabled state on the terminal. However, there is still a need to invoke the communications interface function setCallWaiting of the RIL framework at an interval of a preset time (for example, 10 minutes, half an hour, or 1 hour) to upload a configuration parameter for setting the call waiting service to the enabled state to the home location register. If the terminal moves to the area covered by the 2G or 3G network or signal strength of the terminal recovers, a configuration success message returned by the home location register may be received. Therefore, logic of invoking the setCallWaiting function periodically is ended.

Using this solution may enable the user to perform configuration in any environment. For example, if the user is in confined space and the foregoing solution is used, a configuration failure is always prompted in a process of performing call supplementary service configuration by the user in the confined space because the configuration cannot be completed by using the circuit switched domain. The user needs to move to an area in which signal strength is relatively strong so as to complete the configuration process. However, after the process is added, the user in the confined space needs to perform configuration only once. After the user leaves the confined space and signal strength recovers, the terminal may automatically complete corresponding configuration by using the circuit switched domain, thereby reducing a quantity of times that the user performs configuration, and improving operation convenience.

Further, in this embodiment, if a performing result of the step of determining, according to the configuration feedback information, whether configuration succeeds is that the configuration fails, the configuration parameter may still be stored as on-terminal call supplementary service configuration. However, a network handover event needs to be detected. When it is detected that a network handover occurs, the call supplementary service configuration stored on the terminal is uploaded to the mobile switching center, so that the mobile switching center stores the call supplementary service configuration stored on the terminal as call supplementary service configuration of the circuit switched domain into the home location register. That is, when the configuration fails, there is no need to periodically upload the call supplementary service configuration of the circuit switched domain, but the call supplementary service configuration of the circuit switched domain needs to be uploaded only when a handover of the communications network occurs.

The network handover event is a system event triggered when a coverage area in which the terminal is located is handed over from the LTE network to the 2G or 3G network, or a coverage area is handed over from the 2G or 3G network to the LTE network. When it is detected that a network handover occurs, the terminal is definitely in coverage of a 2G network or a 3G network (otherwise, there is no handover process). Therefore, the circuit switched domain keeps in a connected state. In this case, the locally stored call supplementary service configuration is sent to the home location register for storage, thereby avoiding a case in which a circuit switched domain configuration instruction may be meaninglessly sent for multiple times in a configuration process of periodically sending the circuit switched domain configuration instruction. Therefore, a quantity of times that the circuit switched domain initiates communication is reduced. For a mobile device, power consumption is reduced, and a battery life is prolonged.

In an embodiment, the synchronization method for call supplementary service configuration further includes:

obtaining, by the terminal when being handed over to a communications network based on the circuit switched domain, the call supplementary service configuration stored on the terminal, and uploading the call supplementary service configuration stored on the terminal to a home subscriber server corresponding to the terminal for storage; and sending, by the home subscriber server, the call supplementary service configuration to the home location register corresponding to the terminal for storage.

Figure 12:
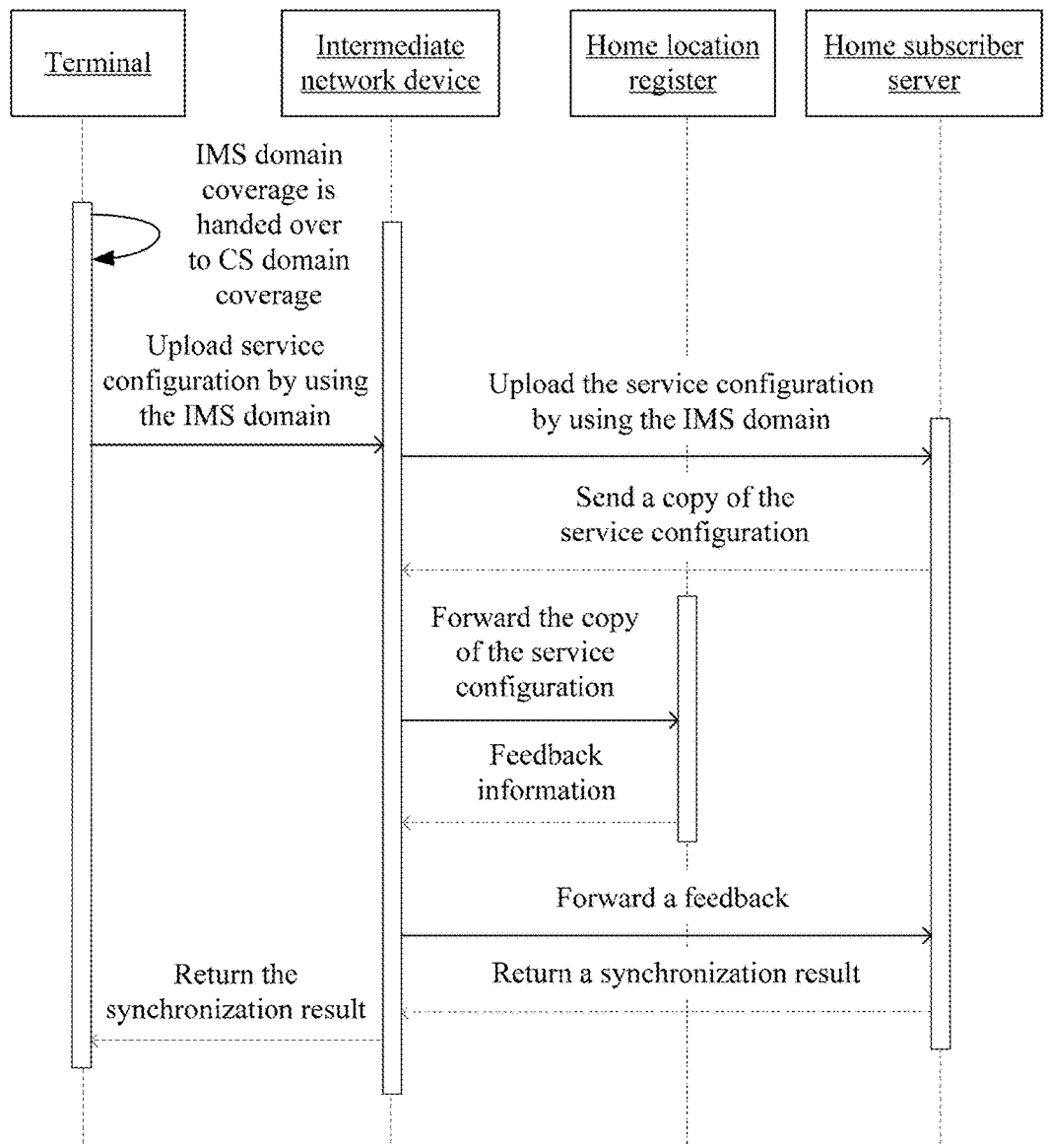
FIG. 12 is a sequence diagram of a process in which a terminal network is handed over to an area covered by a circuit switched domain according to an embodiment.

The home subscriber server (HSS, Home Subscriber Server) is a server, in the LTE network, configured to store user configuration, is an upgraded version of the HLR, and is connected to the mobile switching center MSC. For details, refer to FIG. 10. When the terminal moves from an area covered by the LTE network to an area covered by a conventional 2G or 3G network, a coverage area handover occurs. As shown in FIG. 12, the terminal first uploads the locally stored call supplementary service configuration to the HSS by using an IMS-domain eNodeB (that is, an Evolved Node B, where the evolved Node B is referred to as an eNB for short and is a base station in the LTE network) and an IMS-domain SGSN (Serving GPRS SUPPORT NODE, mobile switching center in the LTE network) for storage. Then, the HSS sends, by using the SGSN, the call supplementary service configuration to an HLR corresponding to a service area to which the terminal is handed over for storage (in another embodiment, the HSS may directly synchronize with the HLR; for the two synchronization manners, refer to dashed line connections in FIG. 10). When the terminal needs to conduct the call supplementary service on the conventional 2G or 3G network, the MSC corresponding to the terminal may conduct the service according to the call supplementary service configuration stored in the HLR.

Further, in this embodiment, the synchronization method for call supplementary service configuration further includes:

sending, by the home location register when the terminal is handed over to a communications network based on a multimedia subsystem, call supplementary service configuration, of the circuit switched domain, corresponding to the terminal to the home subscriber server corresponding to the terminal; and further delivering, by the home subscriber server, the received call supplementary service configuration, of the circuit switched domain, corresponding to the terminal to the terminal, so that the terminal stores the call supplementary service configuration, of the circuit switched domain, corresponding to the terminal as on-terminal call supplementary service configuration.

Figure 13:
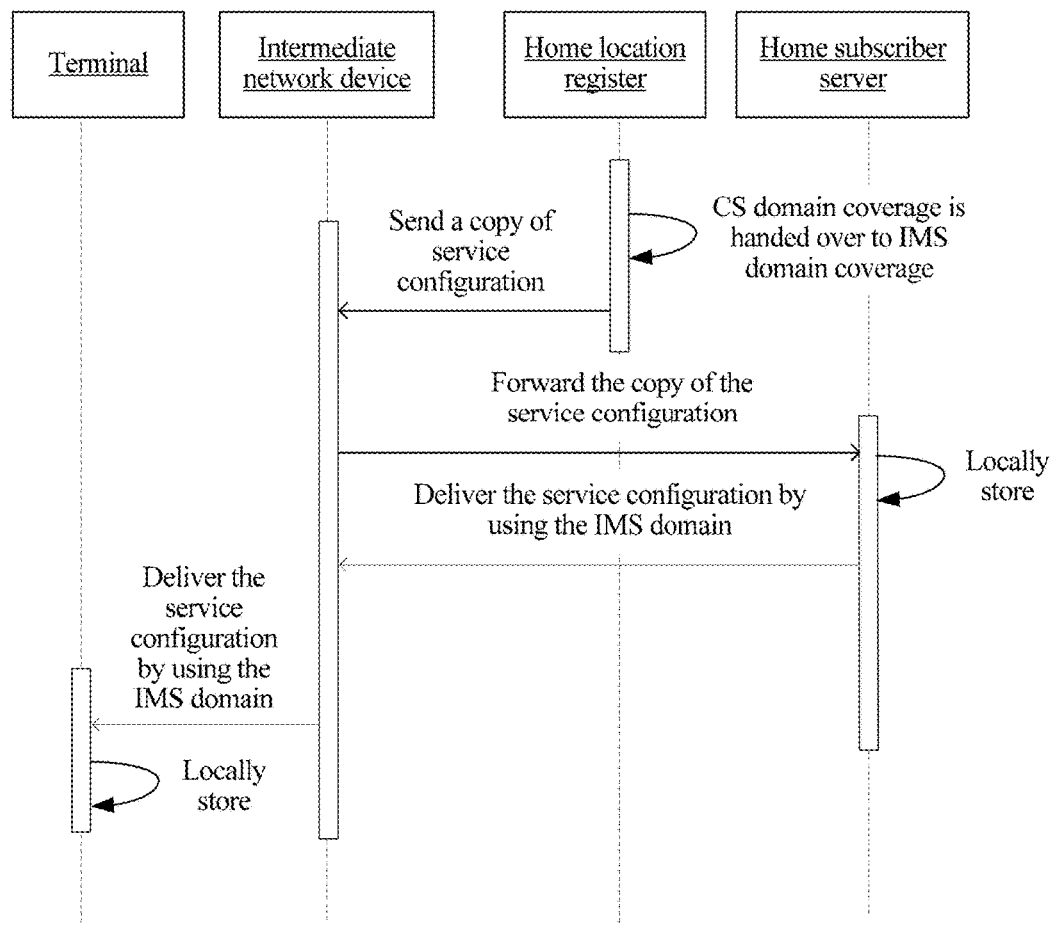
FIG. 13 is a sequence diagram in which a terminal network is handed over to an area covered by an IMS domain according to an embodiment.

When the terminal moves from the area covered by the conventional 2G or 3G network to the area covered by the LTE network, a coverage area handover also occurs. As shown in FIG. 13, when a handover occurs, first the home location register HLR corresponding to the terminal sends, by using the MSC, the call supplementary service configuration stored by the terminal in the home location register to the home subscriber server HSS corresponding to the service area to which the terminal is handed over for storage. Then, the home subscriber server HSS delivers, by using the IMS domain, the call supplementary service configuration to the terminal to perform synchronization. When the terminal needs to conduct the call supplementary service on the LTE network, a network element corresponding to the terminal may conduct the service according to the call supplementary service configuration stored on the terminal.

That is, if an existing operator provides an interface for storing the call supplementary service on a network, that is, provides an interface on the home subscriber server HSS for storing the on-terminal call supplementary service configuration, the terminal can maintain synchronous with the HSS in terms of the stored call supplementary service configuration. However, when a handover is performed between different network environments, call supplementary service configuration performed by the user in the different network environments may be synchronized by a home subscriber server and a home location register that belong to different networks. The user does not need to make any modification on the terminal, and also needs to perform configuration on the terminal only once, so that all network types can be adapted by means of synchronization between the HSS and the HLR, thereby improving a capability, of the call supplementary service configuration stored on the terminal, to adapt to multiple communications networks.

An embodiment of the present invention further proposes a computer storage medium, and the computer storage medium stores a program. When the program is being executed, some or all of the steps in the synchronization method for call supplementary service configuration described in the embodiments of the present invention with reference to FIG. 1 are executed.

In the foregoing synchronization method for call supplementary service configuration, when performing local call supplementary service configuration, a user first performs configuration on a home location register corresponding to a terminal of the user by using a circuit switched domain, and then selects, according to a configuration result in the circuit switched domain, whether to make the local configuration take effect, so that the local configuration of the user (call supplementary service for an IMS domain) and configuration stored on the home location register (call supplementary service configuration for a CS domain) can be kept synchronous. Therefore, the local configuration of the user can be simultaneously applied to an LTE network and conventional 2G and 3G networks, and a capability, of the call supplementary service configuration stored on the terminal, to adapt to multiple communications networks is improved.

In the foregoing embodiments, the description of each embodiment has respective focuses. For a part that is not described in detail in an embodiment, reference may be made to related descriptions in other embodiments.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

The foregoing embodiments merely express several embodiment manners of the present invention. The description is relatively specific and detailed, but should not be construed as limiting the patent scope of the present invention. It should be noted that, for a person of ordinary skill in the art, several deformations and changes may further be made within the conception of the present invention, which all fall within the protection scope of the present invention. Therefore, the protection scope of the present invention patent shall be subject to the following claims.

What is claimed is:

1. A method implemented by a terminal for synchronizing a supplementary call service configuration, the method comprising:
   receiving, by the terminal, a supplementary service configuration instruction;
   obtaining, by the terminal, a configuration parameter corresponding to the supplementary service configuration instruction;
   uploading, by the terminal, the configuration parameter to a mobile switching center using a circuit switched domain for enabling the mobile switching center to store the configuration parameter as the supplementary call service configuration of the circuit switched domain for a home location register;
   receiving, by the terminal, configuration feedback information;
   determining, by the terminal and according to the configuration feedback information, whether a configuration synchronization succeeds; and
   storing, by the terminal, the configuration parameter as an on-terminal supplementary call service configuration when the configuration synchronization succeeds, wherein the on-terminal supplementary call service configuration is used as supplementary call service configuration of 4G network.

2. The method according to claim 1, wherein the method further comprises:
   before receiving, by the terminal, the supplementary service configuration instruction:
     receiving, by the terminal, a power-on instruction, and
     downloading, by the terminal, the supplementary call service configuration of the circuit switched domain using the circuit switched domain from the home location register; and
     storing, by the terminal, the supplementary call service configuration of the circuit switched domain as the on-terminal supplementary call service configuration.

3. The method according to claim 2, wherein downloading, by the terminal, the supplementary call service configuration of the circuit switched domain using the circuit switched domain from the home location register comprises:
   invoking, by the terminal, a communications interface function of a radio interface layer, and
   downloading, by the terminal, the supplementary call service configuration of the circuit switched domain from the home location register using the communication interface function.

4. The method according to claim 1, wherein the method further comprises:
   before receiving, by the terminal, the supplementary service configuration instruction:
     receiving, by the terminal, a service configuration display instruction; and
     downloading, by the terminal, the supplementary call service configuration of the circuit switched domain using the circuit switched domain from the home location register;
     storing, by the terminal, the supplementary call service configuration of the circuit switched domain as the on-terminal supplementary call service configuration; and
     displaying, by the terminal, the on-terminal supplementary call service configuration.

5. The method according to claim 1, wherein after determining, according to the configuration feedback information, whether configuration succeeds, the method further comprises:
   discarding, by the terminal, the configuration parameter if the configuration synchronization fails.

6. The method according to claim 1, wherein the method further comprises:
   after determining, by the terminal and according to the configuration feedback information, whether the configuration synchronization succeeds:
     storing, by the terminal, the configuration parameter as the on-terminal supplementary call service configuration if the configuration synchronization fails; and
     periodically uploading, by the terminal, the on-terminal supplementary call service configuration to the mobile switching center for enabling the mobile switching center to store the on-terminal supplementary call service configuration as the supplementary call service configuration of the circuit switched domain for the home location register.

7. The method according to claim 1, wherein the method further comprises:
   after determining, by the terminal and according to the configuration feedback information, whether the configuration synchronization succeeds:
     storing, by the terminal, the configuration parameter as the on-terminal supplementary call service configuration if the configuration synchronization fails; and
     when detecting, by the terminal, that a network handover occurs, uploading, by the terminal, the on-terminal supplementary call service configuration to the mobile switching center for enabling the mobile switching center to store the on-terminal supplementary call service configuration as the supplementary call service configuration of the circuit switched domain for the home location register.

8. A terminal comprising:
   a memory; and
   at least one processor communicatively coupled to the memory, wherein the at least one processor is configured to:
     receive a supplementary service configuration instruction,
     obtain a configuration parameter corresponding to the supplementary service configuration instruction, upload the configuration parameter to a mobile switching center using a circuit switched domain for enabling the mobile switching center to store the configuration parameter as a supplementary call service configuration of the circuit switched domain for a home location register, receive configuration feedback information, determine, according to the configuration feedback information, whether a configuration synchronization succeeds, and store the configuration parameter as an on-terminal supplementary call service configuration when the configuration synchronization succeeds, wherein the on-terminal supplementary call service configuration is used as supplementary call service configuration of 4G network.

9. The terminal according to claim 8, wherein the at least one processor is configured to:

before receiving the supplementary service configuration instruction:

receive a power-on instruction;

download the supplementary call service configuration of the circuit switched domain using the circuit switched domain from the home location register; and store the supplementary call service configuration of the circuit switched domain as the on-terminal supplementary call service configuration.

10. The terminal according to claim 9, wherein to download the supplementary call service configuration of the circuit switched domain using the circuit switched domain from the home location register, the at least one processor is configured to:

invoke a communications interface function of a radio interface layer; and download the supplementary call service configuration of the circuit switched domain from the home location register using the communication interface function.

11. The terminal according to claim 8, wherein the at least one processor is configured to:

before receiving the supplementary service configuration instruction:

receive a service configuration display instruction;

download the supplementary call service configuration of the circuit switched domain using the circuit switched domain from the home location register;

store the supplementary call service configuration of the circuit switched domain as the on-terminal supplementary call service configuration; and display the on-terminal supplementary call service configuration.

12. The terminal according to claim 8, wherein after determining, according to the configuration feedback information, whether configuration succeeds, the at least one processor is configured to:

discard the configuration parameter if the configuration synchronization fails.

13. The terminal according to claim 8, wherein the at least one processor is configured to:

after determining, according to the configuration feedback information, whether the configuration synchronization succeeds:

store the configuration parameter as the on-terminal supplementary call service configuration if the configuration synchronization fails; and periodically upload the on-terminal supplementary call service configuration to the mobile switching center for enabling the mobile switching center to store the on-terminal supplementary call service configuration as the supplementary call service configuration of the circuit switched domain for the home location register.

14. The terminal according to claim 8, wherein the at least one processor is configured to:

after determining, according to the configuration feedback information, whether the configuration synchronization succeeds:

store the configuration parameter as the on-terminal supplementary call service configuration if the configuration synchronization fails; and when detecting that a network handover occurs, upload the on-terminal supplementary call service configuration to the mobile switching center for enabling the mobile switching center to store the on-terminal supplementary call service configuration as the supplementary call service configuration of the circuit switched domain for the home location register.

15. A system for synchronizing a for supplementary call service configuration, the system comprising:

a home location register configured to send configuration feedback information to a terminal using a mobile switching center; and wherein the terminal is configured to:

receive a supplementary service configuration instruction, obtain a configuration parameter corresponding to the supplementary service configuration instruction, upload the configuration parameter to the mobile switching center using a circuit switched domain for enabling the mobile switching center to store the configuration parameter as a supplementary call service configuration of the circuit switched domain for the home location register, determine, according to the configuration feedback information, whether a configuration synchronization succeeds, and store the configuration parameter as an on-terminal supplementary call service configuration when the configuration synchronization succeeds, wherein the on-terminal supplementary call service configuration is used as supplementary call service configuration of 4G network.

16. The system according to claim 15, wherein:

the system further comprises a home subscriber server;

the terminal is further configured to:

when the terminal is being handed over to a communications network based on the circuit switched domain:

obtain the on-terminal supplementary call service configuration, and upload the on-terminal supplementary call service configuration to the home subscriber server;

wherein the home subscriber server is further configured to send the on-terminal supplementary call service configuration to the home location register; and the on-terminal supplementary call service configuration is stored as the supplementary call service configuration of the circuit switched domain.

17. The system according to claim 16, wherein:

the home location register is further configured to send the supplementary call service configuration of the circuit switched domain to the home subscriber server when the terminal is handed over to the communication network based on a multimedia subsystem; and the home subscriber server is further configured to deliver the supplementary call service configuration of the circuit switched domain to the terminal for enabling the terminal to store the supplementary call service configuration of the circuit switched domain as the on-terminal supplementary call service configuration.

* * * * *